US 11,846,341 B2

United States Patent
Ito et al.

(10) Patent No.: US 11,846,341 B2
(45) Date of Patent: Dec. 19, 2023

(54) DRIVE UNIT AND MAINTENANCE METHOD FOR THE SAME

(71) Applicant: NABTESCO CORPORATION, Tokyo (JP)

(72) Inventors: Koji Ito, Tokyo (JP); Toshiaki Tanaka, Tokyo (JP)

(73) Assignee: NABTESCO CORPORATION, Tokyo (JP)

( * ) Notice: Subject to any disclaimer, the term of this patent is extended or adjusted under 35 U.S.C. 154(b) by 221 days.

(21) Appl. No.: 17/094,269

(22) Filed: Nov. 10, 2020

(65) Prior Publication Data
US 2021/0155340 A1    May 27, 2021

(30) Foreign Application Priority Data

Nov. 27, 2019  (JP) .................. 2019-214411

(51) Int. Cl.
| | | |
|---|---|---|
| *B64C 9/02* | (2006.01) | |
| *B64C 13/50* | (2006.01) | |
| *F16H 21/00* | (2006.01) | |
| *B64F 5/40* | (2017.01) | |
| *B64C 13/30* | (2006.01) | |
| *B64C 13/40* | (2006.01) | |

(52) U.S. Cl.
CPC .............. *F16H 21/00* (2013.01); *B64C 9/02* (2013.01); *B64C 13/30* (2013.01); *B64C 13/40* (2013.01); *B64C 13/504* (2018.01); *B64F 5/40* (2017.01)

(58) Field of Classification Search
CPC .... B64C 9/02; B64C 9/16; B64C 9/18; B64C 9/20; B64C 9/22; B64C 9/24; B64C 9/26; B64C 13/504
See application file for complete search history.

(56) References Cited

U.S. PATENT DOCUMENTS

| | | | |
|---|---|---|---|
| 2010/0074045 A1* | 3/2010 | Ketchum | .................. B29B 7/42 366/77 |
| 2011/0139938 A1* | 6/2011 | Itoh | ........................ B64C 13/24 244/226 |
| 2011/0220761 A1 | 9/2011 | Ogawa et al. | |
| 2014/0150605 A1 | 6/2014 | Ogawa et al. | |

FOREIGN PATENT DOCUMENTS

| | | |
|---|---|---|
| EP | 2332830 A2 | 6/2011 |
| JP | 2011-189818 A | 9/2011 |
| JP | 2014-129843 A | 7/2014 |

OTHER PUBLICATIONS

Extended European Search Report dated Apr. 16, 2021 issued in corresponding European Patent Application No. 20209375.3 (7 pgs.).
Notice of Reasons for Refusal dated Jul. 25, 2023 issued in corresponding Japanese Patent Application No. 2019-214411, with English translation (7 pgs.).

* cited by examiner

*Primary Examiner* — Nicholas McFall
*Assistant Examiner* — Terri L Filosi
(74) *Attorney, Agent, or Firm* — Pillsbury Winthrop Shaw Pittman, LLP

(57) ABSTRACT

A drive unit includes an actuator from which an output rod protrudes at one end of a cylinder and being coupled to a flap of an aircraft, an attachment disposed on the other side of the cylinder, a reaction link coupled to the flap at one end and to the attachment at the other end, and a connection-disconnection section allowing the cylinder and the attachment to be coupled to and separated from each other.

9 Claims, 8 Drawing Sheets

DRIVE UNIT AND MAINTENANCE METHOD FOR THE SAME

CROSS-REFERENCE TO RELATED APPLICATIONS

This application is based on and claims the benefit of priority from Japanese Patent Application Serial No. 2019-214411 (filed on Nov. 27, 2019), the contents of which are hereby incorporated by reference in its entirety.

TECHNICAL FIELD

The present disclosure relates to a drive unit and a maintenance method for the drive unit.

BACKGROUND

An aircraft disclosed in Japanese Patent Application Publication No. 2011-189818 ("the '818 Publication") includes actuators that drive flight control surfaces of the aircraft. In an actuator, an output rod is housed inside a cylinder and the output rod reciprocates therein. An end of the output rod protrudes from one end of the cylinder, and the protruding end of the output rod is coupled to a flight control surface of the aircraft.

A pair of support shafts project from an outer peripheral surface of the other end of the cylinder such that the axis of the cylinder is disposed between the pair of support shafts. A bifurcated leg of a reaction link is pivotally attached to the pair of support shafts respectively. The side of the reaction link opposite to the side attached to the support shafts is pivotally coupled to a hinge shaft of the flight control surface attached to an airframe. The reaction link receives a reaction force that the cylinder receives from the control surface when the output rod is actuated in order to prevent the reaction force from directly applying to the airframe.

In the technical field of the '818 Publication, a drive unit that includes the actuator and the reaction link may sometimes be removed from the flight control surface for maintenance or repair. The actuator and the reaction link are coupled to each other via the support shafts so that the actuator and the reaction link are removed together from the control surface as they form a single unit. Accordingly, in the technique disclosed in the '818 Publication, when it is desired to repair or inspect only one of the actuator and the reaction link instead of repairing or inspecting the entire drive unit, there is no choice but to remove the whole of the drive unit from the control surface, resulting in a poor workability in the maintenance.

SUMMARY

The present invention has been made in view of the above, and an object of the invention is to improve maintenance workability for drive units of flight control surfaces.

A drive unit according to one aspect of the invention includes an actuator from which an output rod protrudes at one end of a cylinder and the output rod being coupled to a movable part of an aircraft, an attachment disposed on the other end side of the cylinder, a reaction link coupled to the movable part at one end and to the attachment at the other end, and a connection-disconnection section allowing the cylinder and the attachment to be coupled to and separated from each other.

In the above configuration, the attachment can be coupled to and separated from the cylinder. By separating the attachment from the cylinder, the reaction link can be separated from the actuator. Thus, one of the reaction link and the actuator can be removed from a control surface while the other remains attached to the control surface. Therefore, only a necessary part can be removed from the control surface for repair or the like without removing the entire drive unit from the control surface, resulting in an improved workability.

In the above drive unit, the connection-disconnection section may include: a flange provided at said the other end of the cylinder, the flange protruding outward in a radial direction of the cylinder; a flange provided at an end of the attachment facing the cylinder, the flange protruding outward in the radial direction of the cylinder; and a bolt allowing the flange of the cylinder and the flange of the attachment to be coupled to and separated from each other.

In the above drive unit, the connection-disconnection section may include a tube portion disposed at one of said the other end of the cylinder and the end of the attachment facing the cylinder, and an insertion portion disposed at the other of said the other end of the cylinder and the end of the attachment facing the cylinder, the insertion portion being fitted in the tube portion.

In the above drive unit, the attachment may include a first electric connector to which an electric wire extended from the outside of the attachment is connected, and the actuator may include an actuator-side electric connector, the actuator-side electric connector being connected to the first electric connector by coupling the attachment to the cylinder.

In the above drive unit, the first electric connector and the actuator-side electric connector may be aligned in an axial direction of the cylinder.

In the above drive unit, a convex portion may be provided at one of said the other end of the cylinder and the end of the attachment facing the cylinder, and the convex portion protrudes toward the other of said the other end of the cylinder and the end of the attachment facing the cylinder. A concave portion may be further provided at the other of said the other end of the cylinder and the end of the attachment facing the cylinder, the convex portion is fitted in the concave portion. A second electric connector connected to the first electric connector may be disposed on one of an end surface of the convex portion on a protruding side and a bottom of the concave portion, and the actuator-side electric connector may be disposed on the other of the end surface of the convex portion on the protruding side and the bottom of the concave portion.

In the above drive unit, the convex portion may be a position sensor provided at said the other end of the cylinder.

In the above drive unit, the actuator may include a manifold that is provided integrally with the cylinder and in which a hydraulic circuit is defined. The attachment may include a first hydraulic connector disposed at one end of a flow path defined inside the attachment and a second hydraulic connector disposed at the other end of the flow path, the first hydraulic connector is connected with a hydraulic pipe outside the attachment. The actuator may include an actuator-side hydraulic connector that is connected to the second hydraulic connector of the attachment when the attachment is coupled to the cylinder, and the actuator includes therein a passage that connects the actuator-side hydraulic connector and the hydraulic circuit.

In the above drive unit, the second hydraulic connector may include a flow path defined therein, an attachment switching valve may be provided in the flow path in the second hydraulic connector, and the attachment switching valve opens the flow path in the second hydraulic connector when the attachment is coupled to the cylinder and closes the flow path in the second hydraulic connector when the attachment is separated from the cylinder. The actuator-side hydraulic connector may include a flow path defined therein, an actuator switching valve may be provided in the flow path in the actuator-side hydraulic connector, and the actuator switching valve opens the flow path in the actuator-side hydraulic connector when the attachment is coupled to the cylinder and closes the flow path in the actuator-side hydraulic connector when the attachment is separated from the cylinder.

In the above drive unit, an outer surface of the attachment may have a pair of cylindrical protrusions, and the pair of protrusions are disposed on opposite sides of an axis of the cylinder. The reaction link may have a pair of leg portions, one of the leg portions swings about one of the protrusions, and the other of the leg portions swings about the other of the protrusions. The first hydraulic connector may be disposed on an end surface of the protrusion on a tip side, and a part of the flow path may be defined inside the cylindrical protrusion.

A drive unit according to another aspect of the invention includes an actuator from which an output rod protrudes at one end of a cylinder, the output rod being coupled to a movable part of an aircraft, an attachment disposed on the other end side of the cylinder, a reaction link coupled to the movable part at one end of the reaction link and coupled to the attachment at the other end of the reaction link, and a connection-disconnection section allowing the cylinder and the attachment to be coupled to and separated from each other. The connection-disconnection section includes: a flange provided at said the other end of the cylinder, the flange protruding outward in a radial direction of the cylinder; a flange provided at an end of the attachment facing the cylinder, the flange protruding outward in the radial direction of the cylinder; and a bolt allowing the flange of the cylinder and the flange of the attachment to be coupled to and separated from each other. The attachment includes a first hydraulic connector disposed at one end of a flow path defined inside the attachment and a second hydraulic connector disposed at the other end of the flow path, the first hydraulic connector is connected with a hydraulic pipe outside the attachment. The actuator includes a manifold and an actuator-side hydraulic connector, the manifold is provided integrally with the cylinder and a hydraulic circuit is defined therein, the actuator-side hydraulic connector is connected to the second hydraulic connector of the attachment when the attachment is coupled to the cylinder, and the actuator further includes therein a passage that connects the actuator-side hydraulic connector and the hydraulic circuit. The second hydraulic connector further includes a flow path defined therein, an attachment switching valve is provided in the flow path in the second hydraulic connector, the attachment switching valve opens the flow path in the second hydraulic connector when the attachment is coupled to the cylinder and closes the flow path in the second hydraulic connector when the attachment is separated from the cylinder. The actuator-side hydraulic connector further includes a flow path defined therein, an actuator switching valve is provided in the flow path in the actuator-side hydraulic connector, and the actuator-side switching valve opens the flow path in the actuator-side hydraulic connector when the attachment is coupled to the cylinder and closes the flow path in the actuator-side hydraulic connector when the attachment is separated from the cylinder.

In the above configuration, the attachment can be coupled to and separated from the cylinder. By separating the attachment from the cylinder, the reaction link can be separated from the actuator. Thus, one of the reaction link and the actuator can be removed from a control surface while the other of the reaction link and the actuator remains attached to the control surface. Further, in the above configuration, to couple the cylinder and the attachment, the flange of the attachment is brought close to the flange of the cylinder to face each other and the bolt is screwed therein. To separate the attachment from the cylinder, the bolt is simply pulled out. In this way, the work of connecting and separating the attachment to/from the cylinder is easy. Further, in the above configuration, the hydraulic pipe outside the drive unit is connected to the actuator via the attachment. Therefore, by separating the attachment from the cylinder, only the actuator can be removed from the movable part of the aircraft without accompanying the hydraulic pipe. Therefore, removal of the actuator becomes easier, and removal of the hydraulic pipe is not required when removing the actuator. Further, in the above configuration, when the cylinder and the attachment are separated, the flow path in the actuator-side hydraulic connector is closed by the actuator switching valve, and the flow path in the second hydraulic connector is closed by the attachment switching valve. Therefore, the working fluid does not leak when the cylinder and the attachment are separated from each other.

A maintenance method for a drive unit according to yet another aspect of the invention includes: a separation step in which an attachment is separated from an actuator, an output rod protruding from the actuator at one end of a cylinder, the output rod being coupled to a movable part of an aircraft, and the attachment being disposed on the other end side of the cylinder; and an actuator removal step in which the output rod is disconnected from the movable part while a reaction link remains coupled to the movable part, one end of the reaction link being coupled to the movable part and the other end of the reaction link being coupled to the attachment.

Thus, the actuator can be removed from a movable part of an aircraft while the reaction link remains attached to the movable part. Therefore, when repairing the actuator, it is not necessary to remove the reaction link and the attachment from the movable part of the aircraft, which improves the workability.

A maintenance method for a drive unit according to another aspect of the invention includes: a separation step in which an attachment is separated from an actuator, an output rod protruding from the actuator at one end of a cylinder, the output rod being coupled to a movable part of an aircraft, and the attachment being disposed on the other end side of the cylinder; and a reaction link removal step in which one end of a reaction link is disconnected from the movable part while the output rod remains coupled to the movable part, the reaction link being coupled to the movable part at said one end of the reaction link and coupled to the attachment at the other end of the reaction link.

Thus, the reaction link can be removed from the movable part of the aircraft while the actuator remains attached to the movable part. Therefore, when repairing the reaction link, it is not necessary to remove the actuator from the movable part of the aircraft, which improves the workability.

DESCRIPTION OF THE EMBODIMENTS

A drive unit according to one embodiment will be described with reference to the appended drawings.

Figure 1:
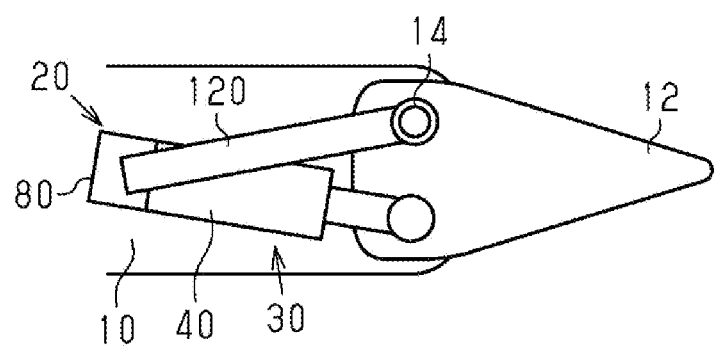
FIG. 1 schematically illustrates a drive unit attached to a main wing and a flap.

As shown in FIG. 1, a flap 12 is connected to a main wing 10 of an aircraft via a rotation shaft 14. The flap 12 is a movable part of the aircraft. A rear end of the flap 12 extends further than a trailing edge of the main wing 10. A drive unit 20 that drives the flap 12 is attached to the main wing 10 and the flap 12.

Figure 2:
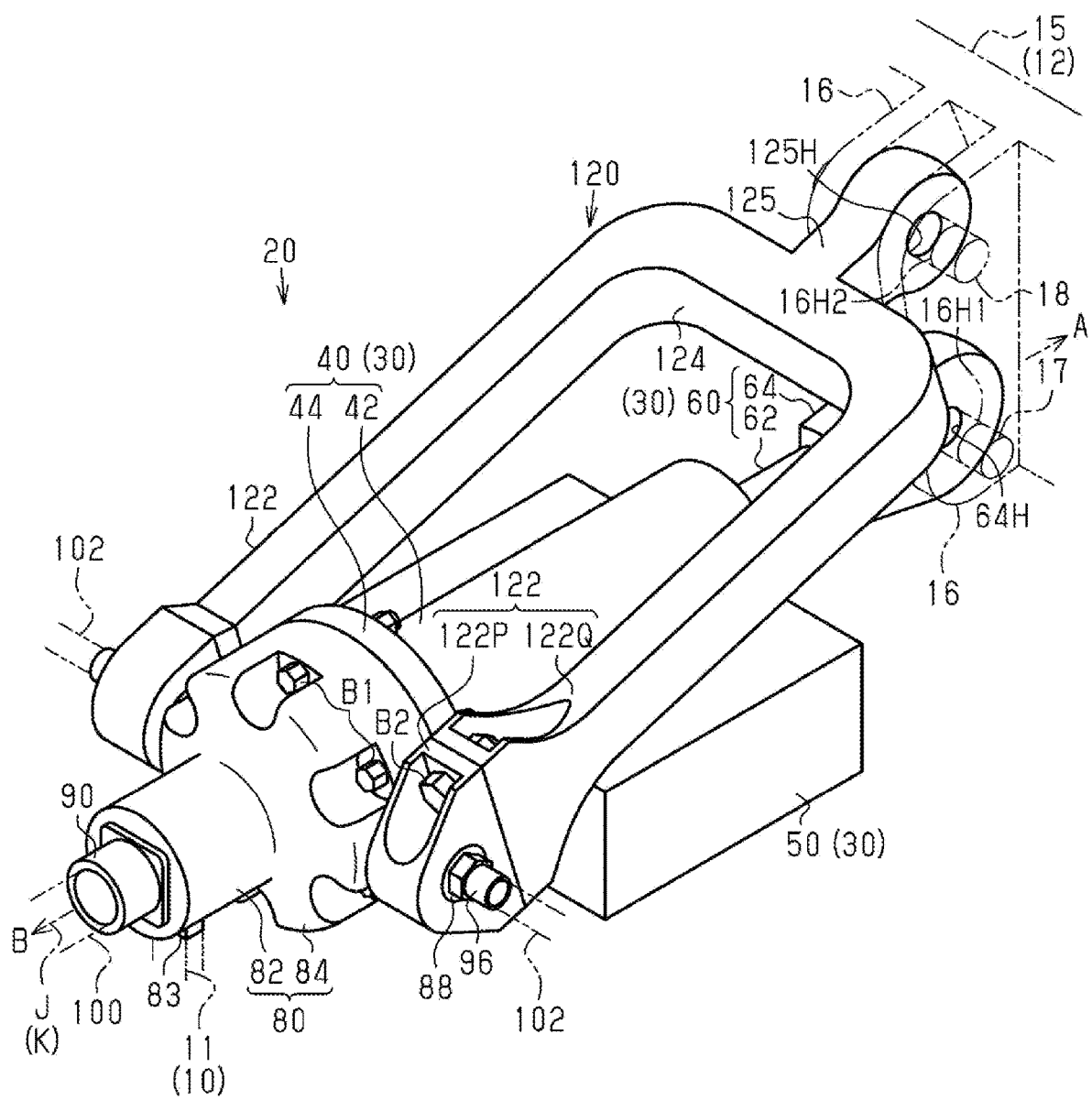
FIG. 2 is a perspective view of the drive unit.
Figure 3:
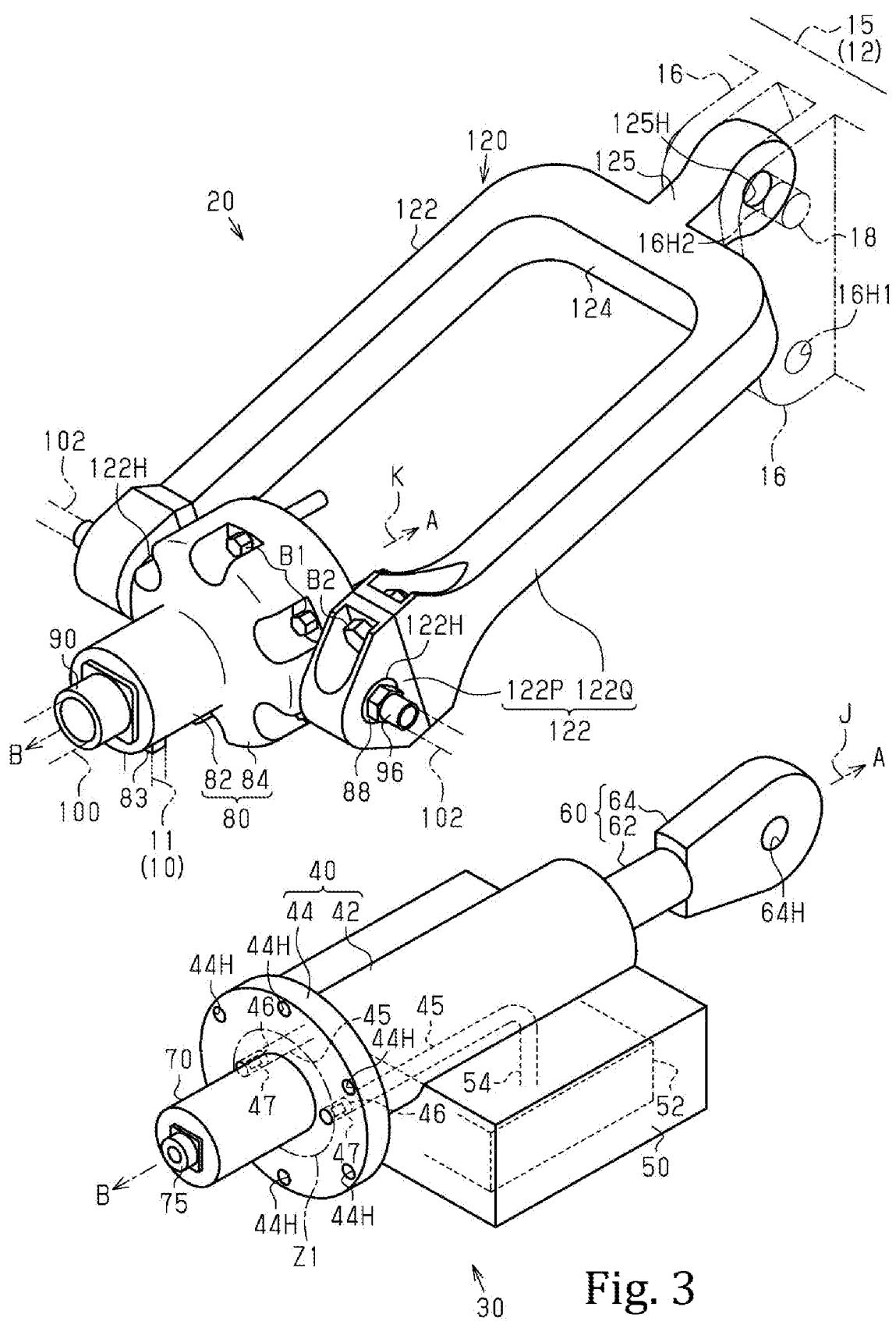
FIG. 3 is an exploded perspective view of the drive unit.

The drive unit 20 includes an electro-hydrostatic actuator 30 (EHA). As shown in FIGS. 2 and 3, a main body of the cylinder 40 (hereinafter, referred to as a cylinder main body 42) has a cylindrical shape. Both ends of the cylinder main body 42 are closed. An end surface of the cylinder main body 42 on the A side of the center axis J faces the rear of the aircraft.

As shown in FIG. 3, a connection passage 45 through which hydraulic oil flows is provided in an outer peripheral wall of the cylinder main body 42. The connection passage 45 is opened at an end face of the cylinder main body 42 on the B side of the center axis J and extends from the end face toward the A side of the center axis J. The connection passage 45 is opened in the outer peripheral surface of the cylinder main body 42 in a middle portion of the cylinder main body 42 in the center axis J direction. Two connection passages 45 are provided on both sides of the cylinder main body 42 with the center axis J disposed therebetween.

An actuator-side hydraulic connector 46 is disposed in the connection passage 45 in the vicinity of the opening formed in the end surface of the cylinder main body 42 on the B side of the center axis J. The actuator-side hydraulic connector 46 has a substantially cylindrical shape. An outer diameter of the actuator-side hydraulic connector 46 corresponds to the diameter of the connection passage 45. The actuator-side hydraulic connector 46 is fitted into the connection passage 45 such that the center axis of the connector coincides with the center axis of the connection passage. An actuator switching valve 47 is provided in a flow path defined by an inner peripheral surface of the actuator-side hydraulic connector 46. The actuator switching valve 47 opens the flow path in the actuator-side hydraulic connector 46 when an attachment 80 described later is coupled to the cylinder 40, and closes the flow path in the actuator-side hydraulic connector 46 when the attachment 80 is separated from the cylinder 40. Note that, for simplicity of the drawing, the actuator switching valve 47 is represented by a square in FIG. 3.

A flange 44 projects radially outward from the outer peripheral surface of the cylinder main body 42. The flange 44 is disposed in the end portion of the cylinder main body 42 on the B side of the center axis J. The flange 44 is formed on the outer peripheral surface of the cylinder main body 42 in the circumferential direction, and has an annular shape in a plan view. A plurality of bolt insertion holes 44H penetrate the flange 44 in the center axis J direction of the cylinder main body 42. Six bolt insertion holes 44H are provided at equal intervals in the circumferential direction of the cylinder main body 42. In FIG. 3, a boundary Z1 between the flange 44 and the cylinder main body 42 is virtually indicated by the alternate long and short dash line.

A manifold 50 that has a rectangular parallelepiped shape as a whole is fixed to the outer peripheral surface of the cylinder main body 42. A hydraulic circuit 52 is formed inside the manifold 50. In FIG. 3, the hydraulic circuit 52 is represented as a rectangular parallelepiped for convenience. The hydraulic circuit 52 includes a solenoid valve for switching the flow path and other elements. In the manifold 50, a connection passage 54 extending from the hydraulic circuit 52 to the outside of the manifold 50 is formed. The connection passage 54 is connected to the opening of the connection passage 45 in the outer peripheral surface of the cylinder main body 42. That is, the connection passage 54 is communicated with the connection passage 45 in the cylinder main body 42. The connection passage 54 is provided such that it corresponds to the connection passage 45 of the cylinder main body 42 respectively. Note that only one connection passage 54 is shown in FIG. 3.

Although not shown, an outer wall of the manifold 50 and the outer peripheral wall of the cylinder main body 42 are provided with a plurality of port holes for communicating the hydraulic circuit 52 in the manifold 50 with the internal space of the cylinder main body 42. Through these port holes, hydraulic oil is supplied to and discharged from the hydraulic circuit 52 in the manifold 50 and the internal space of the cylinder main body 42.

An output rod 60 operated depending on a hydraulic pressure of the hydraulic oil is housed in the cylinder main body 42. A main body of the output rod 60 (hereinafter referred to as a rod main body 62) has a rod shape. The rod main body 62 is disposed on the center axis J of the cylinder main body 42. The rod main body 62 projects from the end surface of the cylinder main body 42 on the A side of the center axis J. A plate-like rod end portion 64 is coupled to the tip of the rod main body 62 protruding from the cylinder main body 42. A thickness direction of the rod end portion 64 is orthogonal to the center axis J of the cylinder main body 42. A rod hole 64H penetrating the rod end portion 64 in the thickness direction is formed.

As shown in FIG. 2, the rod end portion 64 is disposed between a pair of plate-shaped support portions 16 protruding from a spar 15 of the flap 12. A rod connection hole 16H1 penetrates the support portions 16 in the thickness direction. A center axis of the rod connection hole 16H1 extends parallel to a center axis of the rotation shaft 14 of the flap 12. A rod coupling bolt 17 is inserted through both the rod connection hole 16H1 in the pair of support portions 16 and the rod hole 64H in the rod end portion 64. The rod connection bolt 17 is fastened to the pair of support portions 16. The rod end portion 64 can pivot around the rod connection bolt 17. That is, the rod end portion 64 swings using the rod connection bolt 17 as an axis. In this way, the output rod 60 is swingably connected to the flap 12 via the rod connection bolt 17. Note that the rod connection bolt 17 is simplified and represented by a cylinder solid in FIG. 2.

As shown in FIG. 3, a position sensor 70 for sensing a displacement of the output rod 60 relative to the cylinder main body 42 projects from the end surface of the cylinder main body 42 on the B side of the center axis J. The position sensor 70 is provided as a convex portion on the end surface of the cylinder main body 42 on the B side of the center axis J. The position sensor 70 has a columnar shape. The position sensor 70 is fixed to the cylinder main body 42 in a state where the center axis J thereof coincides with the center axis J of the cylinder main body 42.

An actuator-side electric connector 75 is attached to an end surface of the position sensor 70 on the protruding tip side. The actuator-side electric connector 75 has a cylindrical shape as a whole. The actuator-side electric connector 75 is fixed to the end face of the position sensor 70 with its center axis J coincides with the center axis J of the position sensor 70. The actuator-side electric connector 75 is connected to internal wiring of the position sensor 70. Although not shown, a part of the internal wiring of the position sensor 70 is also connected to the manifold 50 to transmit a signal to a solenoid valve and the like of the hydraulic circuit 52. In the embodiment, the actuator 30 includes the cylinder 40, the manifold 50, the output rod 60, and the position sensor 70.

Figure 4:
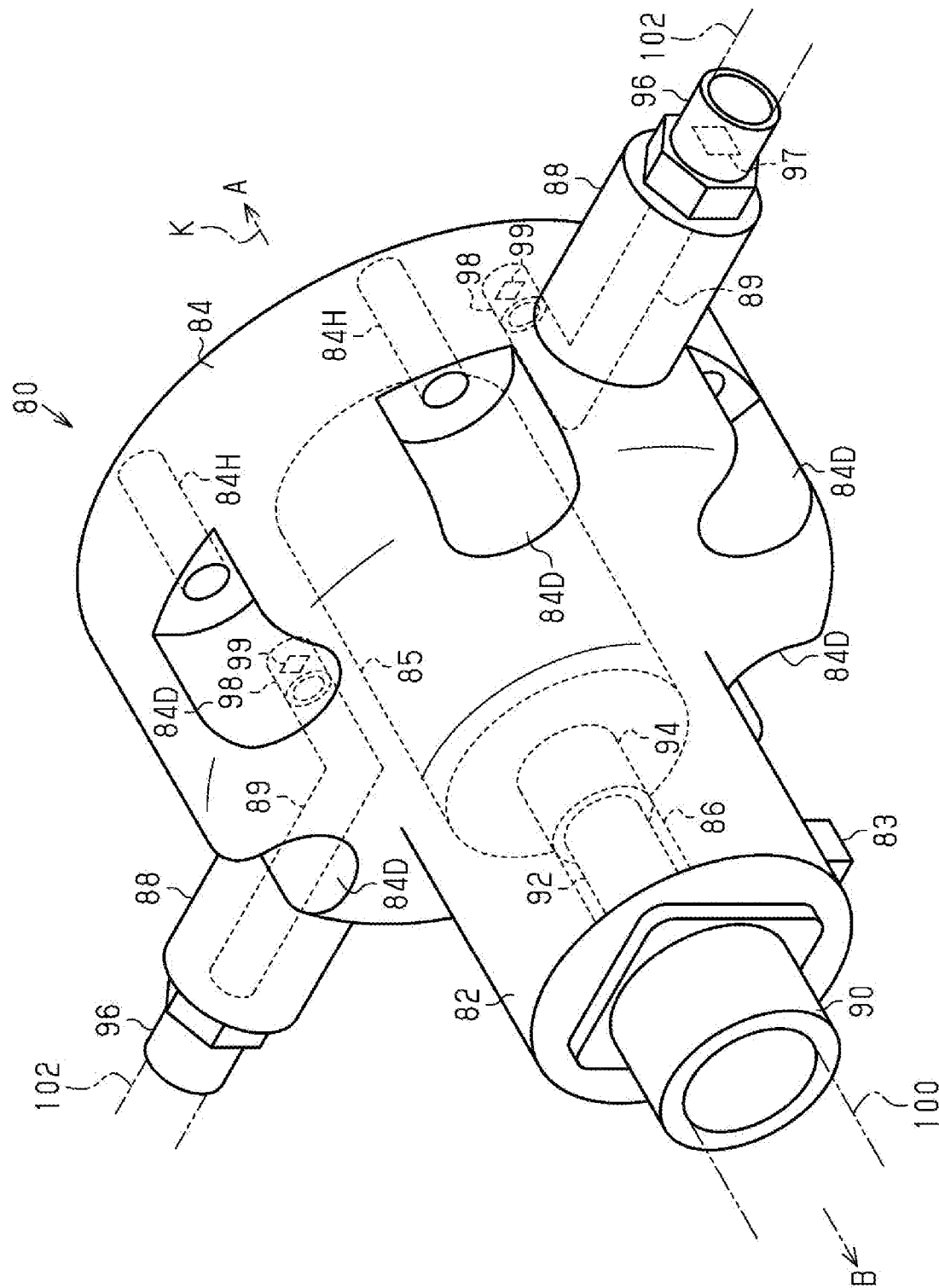
FIG. 4 is a perspective view of an attachment.
Figure 5:
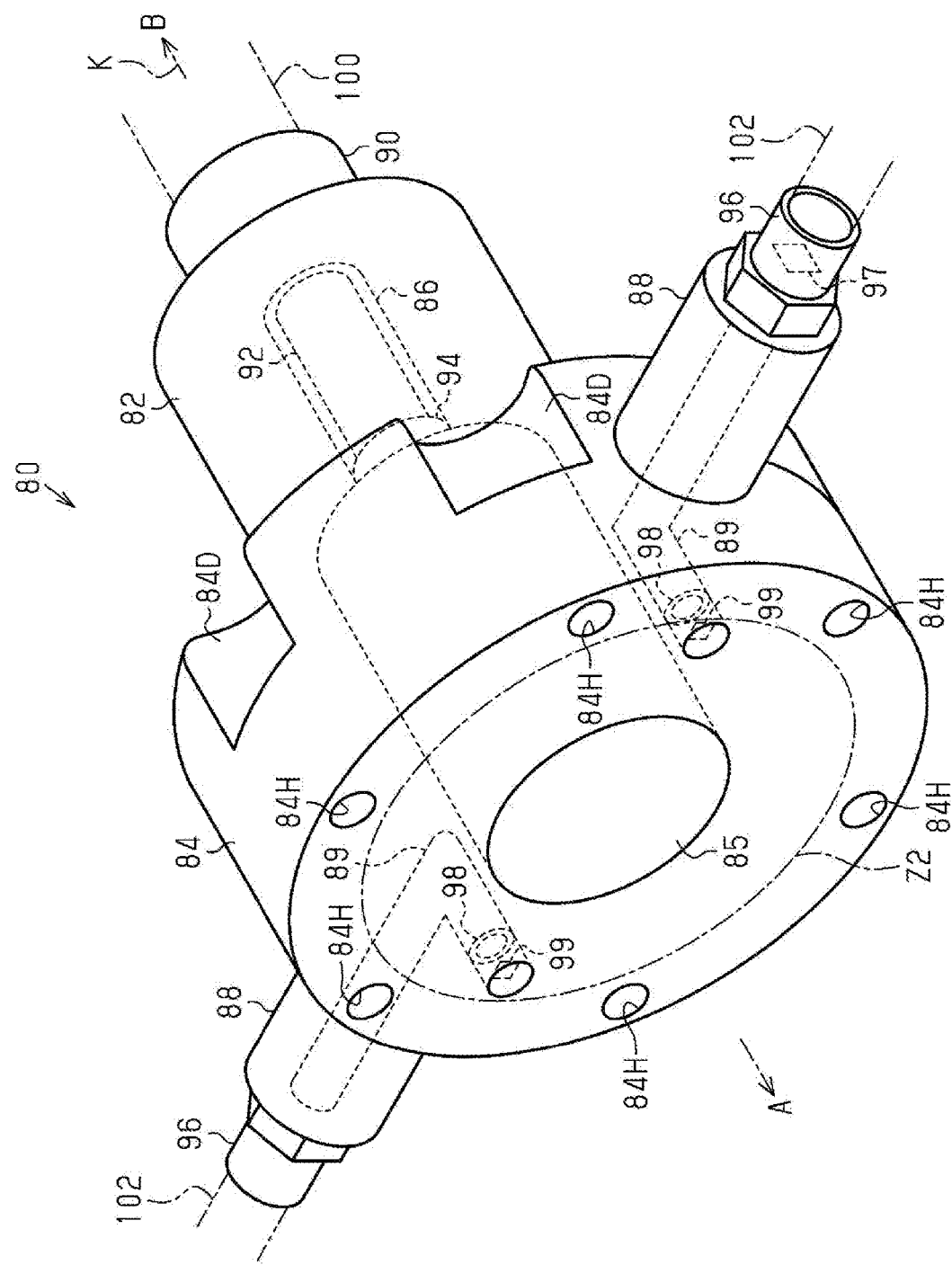
FIG. 5 is a perspective view of the attachment as viewed from the side opposite to that of FIG. 4

As shown in FIG. 2, the attachment 80 is coupled to the end surface of the cylinder main body 42 on the B side of the center axis J. The attachment 80 is detachable from the cylinder main body 42. As shown in FIGS. 4 and 5, a main body of the attachment 80 (hereinafter, referred to as an attachment main body 82) has a columnar shape. The diameter of the attachment main body 82 is substantially the same as the outer diameter of the cylinder main body 42. A fitting recess 85 extends from an end surface of the attachment main body 82 on the A side of a center axis K toward the B side of the center axis K. The fitting recess 85 is formed in a columnar shape. The center axis K of the fitting recess 85 coincides with the center axis K of the attachment main body 82. The inner diameter of the fitting recess 85 is the same as the outer diameter of the position sensor 70. The length of the fitting recess 85 in the attachment main body 82 in the center axis K direction is the same as the length of the position sensor 70 disposed in the cylinder main body 42 in the center axis J direction.

From the bottom surface of the fitting recess 85 described above, a housing hole 86 extends to the end surface of the attachment main body 82 on the B side of the center axis K. The center axis K of the housing hole 86 coincides with the center axis K of the attachment main body 82.

Electrical connection of the attachment 80 is arranged on the center axis K of the attachment main body 82 including the fitting recess 85 and the housing hole 86. Specifically, a first electric connector 90 is attached to an end surface of the attachment main body 82 on the B side of the center axis K. The first electric connector 90 has a cylindrical shape as a whole. The first electric connector 90 is attached to the end surface of the attachment main body 82 such that the center axis K thereof coincides with the center axis K of the attachment main body 82. An electric wire 100 extending from the outside of the attachment main body 82 and outside the drive unit 20 is connected to the first electric connector 90.

A relay wire 92 is connected to the first electric connector 90. The relay wire 92 is disposed in the housing hole 86. An end of the relay wire 92 opposite to the end connected to the first electric connector 90 is connected to a second electric connector 94. The second electric connector 94 is disposed in the vicinity of the opening of the housing hole 86 on the fitting recess 85 side. A part of the second electric connector 94 extends to the bottom of the fitting recess 85. The second electric connector 94 has a substantially cylindrical shape. The outer diameter of the cylinder of the second electric connector 94 corresponds to the diameter of the housing hole 86. The second electric connector 94 is disposed in the housing hole 86 such that the center axis K thereof coincides with the center axis K of the housing hole 86.

A flange 84 projects outward in the radial direction of the attachment main body 82 from the outer peripheral surface of the attachment main body 82. The radial direction of the attachment main body 82 coincides with the radial direction of the cylinder main body 42. The flange 84 is disposed at the end of the attachment main body 82 on the A side of the center axis K. The flange 84 is formed on the outer peripheral surface of the attachment main body 82 in the circumferential direction, and has an annular shape in a plan view. The outer diameter of the flange 84 corresponds to the outer diameter of the flange 44 of the cylinder 40. In FIG. 5, a boundary Z2 between the flange 84 and the attachment main body 82 is virtually indicated by the alternate long and short dash line.

As shown in FIG. 4, a plurality of flange recesses 84D are formed in the flange 84 of the attachment 80 to extend from the end surface of the attachment main body 82 on the B side toward the A side of the center axis K. In the embodiment, the flange recesses 84D also extend in the radial direction of the flange 84 toward the outside. Six flange recesses 84D are provided at equal intervals in the circumferential direction of the attachment main body 82.

As shown in FIGS. 4 and 5, a bolt insertion hole 84H penetrates through the flange 84 of the attachment 80. The bolt insertion hole 84H extends from the bottom surface of the flange recess 84D to the end surface of the attachment main body 82 in the flange 84 on the A side in the center axis K direction. The bolt insertion hole 84H extends parallel to the center axis K direction of the attachment main body 82. The bolt insertion holes 84H are provided so as to correspond the flange recesses 84D respectively. The distance between two adjacent bolt insertion holes 84H is the same as the distance between two adjacent bolt insertion holes 44H in the cylinder 40.

A pair of trunnions 88 project outward from the outer peripheral surface of the flange 84 in the radial direction of the attachment main body 82. The trunnion 88 is a cylindrical protrusion. The trunnions 88 are disposed on opposite sides of the center axis K of the attachment main body 82. The trunnion 88 is situated between the two adjacent flange recesses 84D. The center axis of the trunnion 88 extends along the radial direction of the attachment main body 82.

A through hole 89 extending from the trunnion 88 to the attachment main body 82 is formed in the attachment 80. An inner surface of the through hole 89 defines the flow path of the hydraulic oil. The through hole 89 is partially defined by an inner peripheral surface of the trunnion 88. The through hole 89 penetrates the trunnion 88 and reaches the inside of the attachment main body 82. The through hole 89 bents toward the center axis K direction of the attachment main body 82 in the attachment main body 82. The through hole 89 extends to the end surface of the attachment main body 82 on the A side of the center axis K. The through hole 89 is provided for each trunnion 88. That is, in the attachment 80, the through holes 89 are provided on both sides of the attachment main body 82 with the center axis K therebetween.

A first hydraulic connector 96 is attached to a protruding tip end surface of the trunnion 88. The first hydraulic connector 96 has a cylindrical shape as a whole. The first hydraulic connector 96 is attached to the end surface of the trunnion 88 such that the center axis thereof coincides with the center axis of the trunnion 88. An inner peripheral surface of the first hydraulic connector 96 defines a flow path. This flow path communicates with the through hole 89. The first hydraulic connector 96 is connected to a hydraulic pipe 102 that extends from the outside of the attachment main body 82 and through which hydraulic oil flows. The hydraulic pipe 102 is an element outside the drive unit 20.

A switching valve 97 for the first hydraulic connector is provided in the flow path defined by the inner peripheral surface of the first hydraulic connector 96. The switching valve 97 for the first hydraulic connector opens the flow path in the first hydraulic connector 96 when the hydraulic pipe 102 is connected to the first hydraulic connector 96. The switching valve 97 closes the flow path in the first hydraulic connector 96 when the hydraulic pipe 102 is disconnected from the first hydraulic connector 96. In FIGS. 4 and 5, for convenience, the switching valve 97 for the first hydraulic connector is represented by a square.

A second hydraulic connector 98 is attached to the other opening of the through hole 89 different from the opening closer to the first hydraulic connector 96, that is, the opening of the through hole 89 in the end surface of the attachment main body 82 on the A side of the center axis K. The second hydraulic connector 98 has a substantially cylindrical shape. The outer diameter of the cylinder of the second hydraulic connector 98 corresponds to the diameter of the through hole 89. The second hydraulic connector 98 is fitted in the through hole 89 such that the center axis thereof coincides with the center axis of the through hole 89. A switching valve 99 for the attachment is provided in the flow path defined by the inner peripheral surface of the second hydraulic connector 98. The switching valve 99 for the attachment opens the flow path in the second hydraulic connector 98 when the attachment 80 is coupled to the cylinder 40, and the switching valve 99 closes the flow path in the second hydraulic connector 98 when the attachment 80 is separated from the cylinder 40.

As shown in FIG. 2, when the attachment 80 is coupled to the cylinder 40, the center axis J of the cylinder main body 42 and the center axis K of the attachment main body 82 are aligned with each other, and the end surface of the attachment main body 82 on the A side of the center axis K faces the end surface of the cylinder main body 42 on the B side of the center axis J. At the same time, the flange 84 of the attachment 80 and the flange 44 of the cylinder 40 face each other. In this state, fastening bolts B1 are inserted into the bolt insertion holes 44H in the flange 44 of the cylinder 40 and the corresponding bolt insertion holes 84H in the flange 84 of the attachment 80. The flange 84 of the attachment 80 and the flange 44 of the cylinder 40 are coupled to each other by the fastening bolt B1. The flange 84 of the attachment 80 and the flange 44 of the cylinder 40 are fastened at a total of six locations according to the number of the bolt insertion holes 44H in the cylinder 40 and the number of the bolt insertion holes 84H in the attachment 80. The fastening bolts B1, the flange 44 of the cylinder 40, and the flange 84 of the attachment 80 form a connection-disconnection section that connects and separates the attachment 80 to/from the cylinder 40.

Further, in the state where the attachment 80 is coupled to the cylinder 40, the position sensor 70 (see FIG. 3) is disposed inside the fitting recess 85 (see FIG. 4) of the attachment 80. As described above, since the outer dimension of the fitting recess 85 corresponds to the outer dimension of the position sensor 70, the position sensor 70 is fitted into the fitting recess 85. The actuator-side electric connector 75 on the protruding end surface of the position sensor 70 is connected to the second electric connector 94 disposed at the bottom of the fitting recess 85. As a result of electrical connection between the actuator-side electric connector 75 and the second electric connector 94, the electric wire 100 extending from the outside of the attachment main body 82 is connected to the wiring of the actuator 30 via the first electric connector 90, the relay wire 92, the second electric connector 94, and the actuator-side electric connector 75.

As shown in FIG. 4, the center axis K of the first electric connector 90 and the second electric connector 94 coincides with the center axis K of the attachment main body 82. Further, as shown in FIG. 3, the center axis J of the actuator-side electric connector 75 coincides with the center axis J of the cylinder main body 42. As shown in FIG. 2, the center axis K of the attachment main body 82 and the center axis J of the cylinder main body 42 coincide with each other. That is, the first electric connector 90, the second electric connector 94, and the actuator-side electric connector 75 are coaxially arranged on the center axis J of the cylinder main body 42.

Further, in a state where the attachment 80 is coupled to the cylinder 40, the two second hydraulic connectors 98 in the attachment 80 are connected to the corresponding actuator-side hydraulic connectors 46 in the cylinder 40, respectively. Accordingly, the hydraulic pipe 102 extending from the outside of the attachment main body 82 is connected to the hydraulic circuit 52 in the manifold 50 via the first hydraulic connector 96, the through hole 89 in the attachment 80, the second hydraulic connector 98, the actuator-side hydraulic connector 46, the connection passage 45 of the cylinder 40, and the connection passage 54 of the manifold 50.

In the attachment 80, a plate-shaped coupling portion 83 projects from the attachment main body 82. The coupling portion 83 is detachably connected to a coupling member 11 extending from the spar of the main wing 10.

As shown in FIG. 3, the attachment 80 is coupled to a reaction link 120 that receives a reaction force acting on the cylinder 40 when the output rod 60 operates. The reaction link 120 prevents the reaction force from directly acting on the main wing 10 by receiving the reaction force thereon. The reaction link 120 has a pair of linear leg portions 122 arranged parallel to each other and a connecting portion 124 connecting one ends of the pair of leg portions 122. The reaction link 120 has a U shape as a whole.

At a tip end of each leg portion 122, a leg hole 122H is formed. The leg holes 122H are provided such that they are aligned coaxially in one leg portion 122 and the other leg portion 122. The diameter of the leg hole 122H corresponds to the diameter of the trunnion 88. One leg portion 122 is divided into a tip-side portion 122P and a butt-side portion 122Q at a position with some distance away from the leg hole 122H in the extension direction of the leg portion 122 toward the butt end of the leg. By dividing the leg into the two parts, the tip-side portion 122P and the butt-side portion 122Q the reaction link 120 can be attached to and detached from the attachment 80. The tip-side portion 122P and the butt-side portion 122Q are fastened with a link bolt B2 to form a single body.

A link end portion 125 projects from the connecting portion 124 toward the side opposite to the leg portions 122. A link end hole 125H penetrates the link end portion 125. A center axis of the link end hole 125H is parallel to the center axis of the leg hole 122H.

In a state where the reaction link 120 is coupled to the attachment 80, one trunnion 88 of the attachment 80 is inserted into the leg hole 122H of the corresponding one leg portion 122 of the reaction link 120. Further, the other trunnion 88 is inserted into the corresponding leg hole 122H of the other leg portion 122. Thus, the pair of legs 122 is able to pivot about the pair of trunnions 88. In other words, the pair of legs 122 is swingable around the pair of trunnions 88. In this manner, the pair of legs 122 are swingably coupled to the pair of trunnions 88.

The link end portion 125 of the reaction link 120 is situated between the pair of plate-shaped support portions 16 of the spar 15 of the flap 12. A link connection hole 16H2 penetrates the support portions 16 in the thickness direction. A center axis of the link connection hole 16H2 coincides with the center axis of the rotation shaft 14 of the flap 12. Then, a link connection bolt 18 is inserted in both the link connection holes 16H2 of the pair of support portions 16 and the link end hole 125H of the link end portion 125. The link connection bolt 18 is fastened to the pair of support portions 16. The link end portion 125 is able to pivot about the link connection bolt 18. That is, the link end portion 125 swings around the link connection bolt 18. In this way, the reaction link 120 is swingably coupled to the flap 12 via the link connection bolt 18. Note that the link connection bolt 18 is simplified and represented by a cylinder solid in FIGS. 2 and 3.

Operation in the embodiment will be now described. A maintenance method for the actuator 30 will be first described. As shown in FIG. 3, in this maintenance method, the cylinder 40 and the attachment 80 are first separated from each other by removing the fastening bolt B1 that connects the cylinder 40 and the attachment 80. This work is a separation step. Next, the rod end portion 64 is removed from the flap 12 by removing the rod connection bolt 17 while the reaction link 120 remains connected to the flap 12. This work is an actuator removal step. Once the actuator removal step is completed, the actuator 30 is separated from all other members and becomes free to be moved. After the actuator removal step, inspection and/or repair are performed on parts and components of the actuator 30. This work is an actuator maintenance step.

When the actuator 30 is attached again to the flap 12 and the attachment 80 after the inspection and/or repair of the actuator 30, the rod end portion 64 is first coupled to the flap 12 by the rod connection bolt 17. This work is an actuator mounting step. Subsequently, the cylinder 40 and the attachment 80 are coupled to each other by the fastening bolt B1. This work is a coupling step. Once the coupling step is performed, the actuator 30 is coupled to the flap 12 and also to the reaction link 120 via the attachment 80 as shown in FIG. 2.

A maintenance method for the reaction link 120 and the attachment 80 will be described. The electric wire 100 is first removed from the first electric connector 90 and the hydraulic pipe 102 is also removed from the first hydraulic connector 96. This work is a wiring and piping removal step. The above-described separation step is performed to separate the attachment 80 from the cylinder 40. The reaction link 120 is then removed from the flap 12 by removing the link connection bolt 18 while the rod end portion 64 remains connected to the flap 12. This work is a reaction link removal step. Subsequently, the coupling portion 83 of the attachment 80 is disconnected from the coupling member 11 that extends from the main wing 10. This work is a main wing disconnection step. Once the main wing disconnection step is performed, the reaction link 120 and the attachment 80 coupled to each other to form a single body is separated from all other members and can be freely moved.

Next, the link bolt B2 is released from the reaction link 120. Consequently, the tip-side portion 122P of one leg portion 122 in the reaction link 120 is separated from the butt-side portion 122Q of the leg portion 122 in the reaction link 120. By moving the tip-side portion 122P of the leg portion 122 in the direction away from the trunnion 88 along the center axis of the leg hole 122H (toward the front side in the drawing), the tip-side portion 122P of the leg portion 122 is removed from the trunnion 88. Further, by moving a remaining portion of the reaction link 120 other than the tip-side portion 122P of the leg portion 122 in the reaction link 120 in a direction away from the trunnion 88 along the center axis of the leg hole 122H (toward the back side in the drawing), the remaining portion of the reaction link 120 other than the tip-side portion 122P can be removed from the trunnion 88. This work is a reaction link disassembly step. Once the reaction link disassembly step is performed, the reaction link 120 and the attachment 80 are disassembled from each other. After the reaction link disassembly step, parts and components of the reaction link 120 and the attachment 80 are inspected and/or repaired. This work is a reaction link and attachment maintenance step.

When the reaction link 120 and the attachment 80 are assembled back to their original positions after the inspection and/or maintenance of the reaction link 120 and the attachment 80 are completed, the procedure reverse to that of the removal is performed. The trunnion 88 is first inserted into the leg hole 122H of the reaction link 120, and the reaction link 120 is fixed by the link bolt B2. This work is a reaction link assembly step. The coupling portion 83 of the attachment 80 is coupled to the coupling member 11 that extends from the main wing 10. This step is a main wing connection step. Subsequently, the reaction link 120 is coupled to the flap 12 by the link connection bolt 18. This work is a reaction link mounting step. The above-mentioned coupling step in which the cylinder 40 and the attachment 80 is jointed with the fastening bolt B1 is then performed. Subsequently, the hydraulic pipe 102 is connected to the first hydraulic connector 96, and the electric wire 100 is connected to the first electric connector 90. This work is a piping and wiring connection step. Though the above works, the reaction link 120 and the attachment 80 can be attached to the actuator 30 and the flap 12.

Advantageous effects of the embodiment will be now described.

(1) In the drive unit 20, repair and/or inspection may be required only for specific parts such as the actuator 30 and the reaction link 120 among the plurality of parts constituting the drive unit 20. In such a case, if the entire drive unit 20 is required to be removed from the flap 12 and the main wing 10, workability is poor. In this respect, according to the embodiment, the attachment 80 to which the reaction link 120 is attached can be coupled to and separated from the cylinder 40 of the actuator 30. Thus, by separating the attachment 80 and the cylinder 40, the integrated body of the reaction link 120 and the attachment 80 can be separated from the actuator 30. Therefore, only the actuator 30 can be removed from the flap 12 and the main wing 10 while the integrated body of the reaction link 120 and the attachment 80 remains connected to the flap 12 and the main wing 10. It is also possible that the integrated body of the reaction link 120 and the attachment 80 can be removed from the flap 12 and the main wing 10 while the actuator 30 remains coupled to the flap 12 and the main wing 10. As described above, in the above configuration, it is not necessary to remove the entire drive unit 20 from the flap 12 or the main wing 10 when repair and/or inspection of the drive unit 20 is performed, and only necessary parts can be removed from the flap 12 or the main wing 10, which improves the workability. In particular, the actuator 30 is an electrical device so that the chance of malfunction is higher than the reaction link 120 which is a structural component. Therefore, the actuator 30 may often require repair and/or inspection and the above configuration is advantageous from the viewpoint of maintenance of the actuator 30.

(2) In the case where the electric wire 100 extending from the outside of the drive unit 20 is connected to the actuator 30, the electric wire 100 is attached to the actuator 30 when removing the actuator 30 from the flap 12 or the main wing 10. In this case, the electric wire 100 may interfere with the removal work of the actuator 30. The electric wire 100 is possibly removed from the actuator 30 in advance, however, it takes an extra effort to remove the electric wire 100 from the actuator 30. In this respect, in the above configuration, the electric wire 100 is connected to the actuator 30 via the attachment 80. Therefore, by separating the attachment 80 from the cylinder 40, only the actuator 30 can be removed from the flap 12 and the main wing 10 without accompanying the electric wire 100. Therefore, the removal work of the actuator 30 becomes easier, and removal of the electric wire 100 is not required when removing the actuator 30.

(3) In the case where the hydraulic pipe 102 extending from the outside of the drive unit 20 is connected to the actuator 30, the hydraulic pipe 102 is attached to the actuator 30 when removing the actuator 30 from the flap 12 or the main wing 10. In this case, the hydraulic pipe 102 may interfere with the removal work of the actuator 30. The hydraulic pipe 102 is possibly removed from the actuator 30 in advance, however, it takes an extra effort to remove the hydraulic pipe 102 from the actuator 30. In this respect, in the above configuration, the hydraulic pipe 102 is connected to the actuator 30 via the attachment 80. Therefore, by separating the attachment 80 from the cylinder 40, only the actuator 30 can be removed from the flap 12 and the main wing 10 without accompanying the hydraulic pipe 102. Therefore, the removal work of the actuator 30 becomes easier, and removal of the hydraulic pipe 102 is not required when removing the actuator 30.

(4) Once the cylinder 40 is separated from the attachment 80, the flow path in the actuator-side hydraulic connector 46 is closed by the actuator switching valve 47 provided in the actuator-side hydraulic connector 46. Further, the flow path in the second hydraulic connector 98 is closed by the attachment switching valve 99 provided in the second hydraulic connector 98 of the attachment 80. Therefore, the working fluid does not leak when the cylinder 40 and the attachment 80 are separated from each other.

(5) When the first electric connector 90 and the second electric connector 94 are arranged at positions where their central axes are not aligned from each other, the relay wire 92 has to be routed in the circumferential direction, for example, resulting in a complicated routing of the relay wire 92 to electrically connect the first electric connector 90 and the second electric connector 94. In this respect, in the above configuration, the first electric connector 90 and the second electric connector 94 are arranged at positions where their central axes coincide with each other. Therefore, the relay wire 92 that connects the first electric connector 90 and the second electric connector 94 can be arranged coaxially with these connectors in a straight line, and therefore the relay wire 92 can be simply routed.

(6) The second electric connector 94 is disposed at the bottom of the fitting recess 85 in the attachment 80, and the actuator-side electric connector 75 is provided on the pro-jecting tip end surface of the position sensor 70 fitted in the fitting recess 85. In the configuration where the position sensor 70 is fitted in the fitting recess 85 as described above, even if the position sensor 70 is slightly displaced during fitting of the position sensor 70 into the fitting recess 85, the position sensor 70 is guided by the fitting recess 85 and eventually settle into the fitting recess 85. Therefore, the position sensor 70 is reliably fitted in the fitting recess 85. Moreover, since the second electric connector 94 is disposed in the fitting recess 85 and the actuator-side electric connector 75 is disposed in the position sensor 70, the second electric connector 94 and the actuator-side electric connector 75 are securely connected to each other.

Further, the position sensor 70 is used as a convex portion that fits into the fitting recess 85. Since the position sensor 70 also serves as the convex portion to be fitted into the fitting recess 85, it is not necessary to separately provide the convex portion and the position sensor 70, which contributes to reduction of the number of components.

(7) The trunnion 88 of the attachment 80 is provided with the through hole 89 that serves as a flow path for hydraulic oil. Here, the trunnion 88 has a large diameter so as to secure its rigidity for supporting the reaction link 120. With the trunnion 88 having a large diameter and high rigidity, it is unlikely that cracks or the like is made even when the through hole 89 having a size in which the hydraulic oil can flow is formed therein.

Further, in the above configuration, the first hydraulic connector 96 that connects the hydraulic pipe 102 is provided on the end surface of the trunnion 88 on the protruding tip side. Here, the trunnion 88 serves as the axis of swing of the reaction link 120. Therefore, even when the reaction link 120 swings, the trunnion 88 itself does not move. Accordingly, since the first hydraulic connector 96 is provided in the trunnion 88, the hydraulic pipe 102 connected to the first hydraulic connector 96 does not swing together with the reaction link 120 even when the reaction link 120 swings.

(8) In the above configuration, the flange 44 of the cylinder 40 and the flange 84 of the attachment 80 are connected by the fastening bolt B1. In such coupling structure using the flanges, when the cylinder 40 and the attachment 80 are connected, the flange 44 of the cylinder 40 and the flange 84 of the attachment 80 are brought close to face each other and the fastening bolt B1 is screwed into the flanges in the direction of the center axis J of the cylinder main body 42. Further, when separating the cylinder 40 from the attachment 80, the fastening bolt B1 is pulled out. As described above, the work of connecting and separating the cylinder 40 to/from the attachment 80 is easy.

The foregoing embodiment can be modified as described below. The above embodiment and the following modifications can be implemented in combination to the extent where they are technically consistent with each other.

The procedure of the maintenance method for the actuator 30 is not limited to the above described embodiment. For example, the order of performing the separation step and the actuator removal step may be transposed.

Similar to the above modification example, the procedure of the maintenance method for the reaction link 120 and the attachment 80 is not limited to the example of the above embodiment.

One or more of the above-described works in the maintenance method for the reaction link 120 and the attachment 80 may be omitted. For example, if it is possible to perform the repair or inspection work on the reaction link 120 and the attachment 80 while they are connected to each other and form a single body, the reaction link assembly step is unnecessary.

The shapes of the component parts of the actuator 30 such as the cylinder 40 and the manifold 50 are not limited to the examples in the above embodiment. For example, the cylinder main body 42 may be formed in a polygonal shape. Further, a different number of bolt insertion holes 44H may be formed.

The general shape of the reaction link 120 is not limited to the example in the above embodiment. The reaction link 120 may be configured to have a V shape as a whole, for example. Even in this case, as long as the two leg holes 122H are coaxially provided to each other, the reaction link 120 can be pivotally connected to the attachment 80 via the trunnion 88.

The general shape of the attachment 80 is not limited to the example in the above embodiment. For example, the attachment main body 82 may have a rectangular parallelepiped shape.

The configuration of the position sensor 70 is not limited to the example in the above embodiment. When the output rod 60 is operated to drive the flap 12, the reaction link 120 pivots about the trunnion 88 as the output rod 60 moves. Therefore, by sensing a relative displacement angle of the reaction link 120 with respect to the trunnion 88, the relative displacement of the output rod 60 with respect to the cylinder 40 can be known. An encoder that senses the relative displacement angle of the reaction link 120 may be provided in the vicinity of the trunnion 88, and the encoder may be used as the position sensor.

When the position sensor is configured as described above, instead of the position sensor 70, a columnar-shaped housing that has an internal space for accommodating wiring may be provided to project from the end surface of the cylinder main body 42 on the B side of the center axis J. Then, the actuator-side electric connector 75 may be disposed on a tip protruding-end surface of the housing. In this case, the housing forms the convex portion provided at the end of the cylinder main body 42 on the B side of the center axis J. Once the cylinder 40 and the attachment 80 are coupled, the housing fits into the fitting recess 85 of the attachment 80. The actuator-side electric connector 75 and the second electric connector 94 are connected. As described above, any component or structure other than the position sensor 70 may serve as the convex portion provided at the end of the cylinder main body 42 on the B side of the center axis J.

Figure 6:
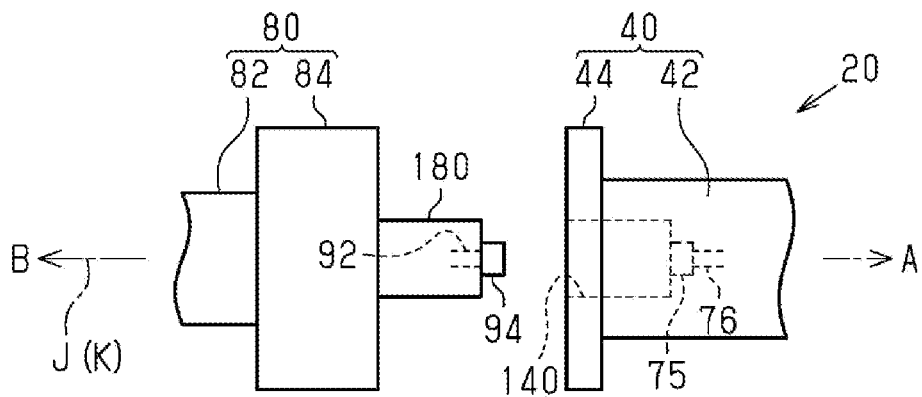
FIG. 6 is a schematic side view illustrating a modification example relating to engagement between an actuator and the attachment.

Instead of providing a convex portion such as the position sensor 70 on the end surface of the cylinder main body 42 on the B side of the center axis J and providing a concave portion in which the convex portion fits on the end of the attachment main body 82 on the A side of the center axis K, an attachment-side convex portion 180 projecting toward the A side of the center axis K is provided on the end surface of the attachment main body 82 on the A side of the center axis K, and a cylinder-side concave portion 140 into which the attachment-side convex portion 180 fits may be provided at the end of the cylinder main body 42 on the B side of the center axis J as shown in FIG. 6. In the example shown in FIG. 6, the attachment-side convex portion 180 is formed in a columnar shape, and the cylinder-side concave portion 140 is also formed in a columnar shape. The second electric connector 94 is disposed on the end surface of the attachment-side convex portion 180 on the protruding tip side, and the actuator-side electric connector 75 is disposed on the bottom of the cylinder-side concave portion 140. Even in this configuration, the second electric connector 94 and the actuator-side electric connector 75 are connected as the attachment-side convex portion 180 is fitted in the cylinder-side concave portion 140. In this way, the wiring 76 inside the actuator 30 is connected to the external electric wire 100 of the drive unit 20 via the relay wire 92 or the like inside the attachment main body 82.

Figure 7:
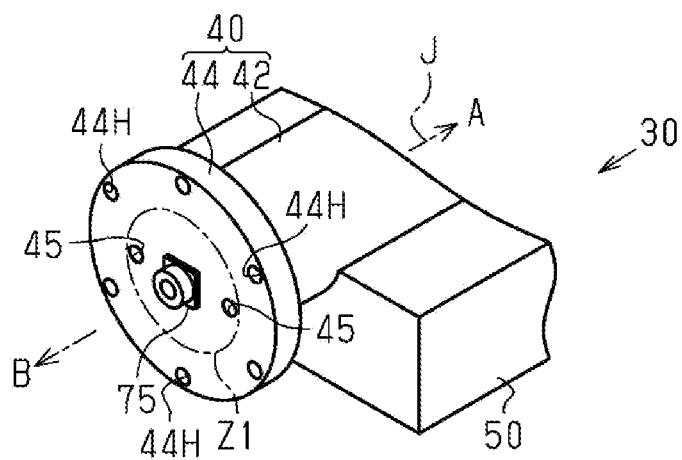
FIG. 7 is a perspective view illustrating a modification example where a position sensor is omitted in the actuator.
Figure 8:
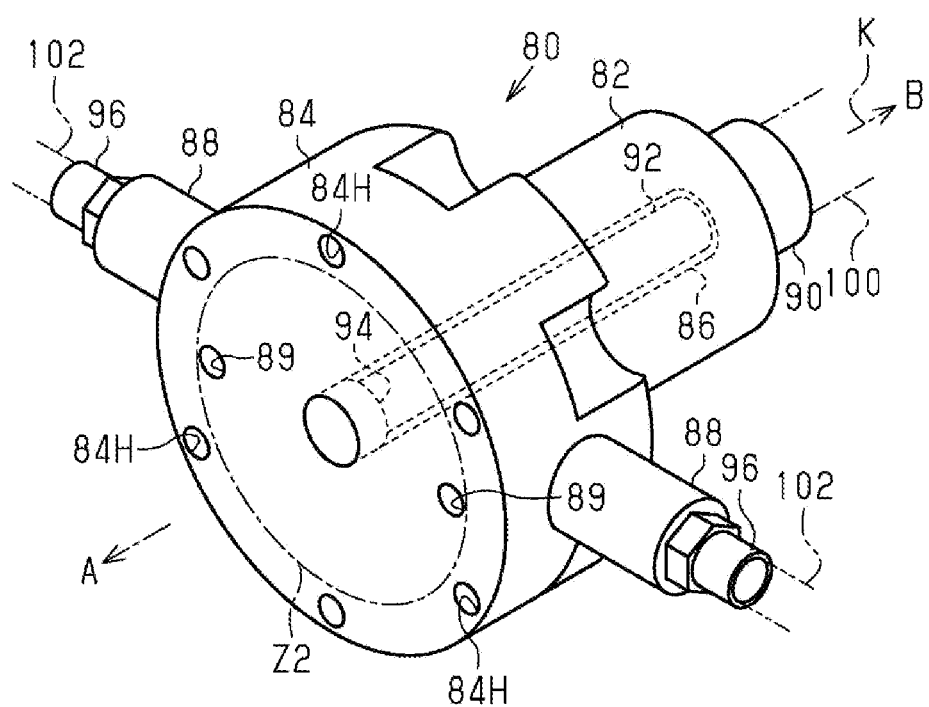
FIG. 8 is a perspective view illustrating a modification example where a fitting recess is omitted in the attachment.

The fitting feature between the convex portion and the concave portion of the attachment main body 82 and the cylinder main body 42 may be omitted. Alternatively, as shown in FIG. 7, in the actuator 30, the position sensor 70 is removed from the end surface of the cylinder main body 42 on the B side of the center axis J and the actuator-side electric connector 75 is provided on the end surface of the cylinder main body 42 on the B side of the center axis J. Further, as shown in FIG. 8, in the attachment 80, the fitting recess 85 is removed and the housing hole 86 is extended to the end surface of the attachment main body 82 on the A side of the center axis K. Then, the second electric connector 94 is disposed near the end surface of the attachment main body 82 on the A side of the center axis K. With such a configuration, when the cylinder 40 and the attachment 80 are connected, the actuator-side electric connector 75 and the second electric connector 94 are connected.

Figure 9:
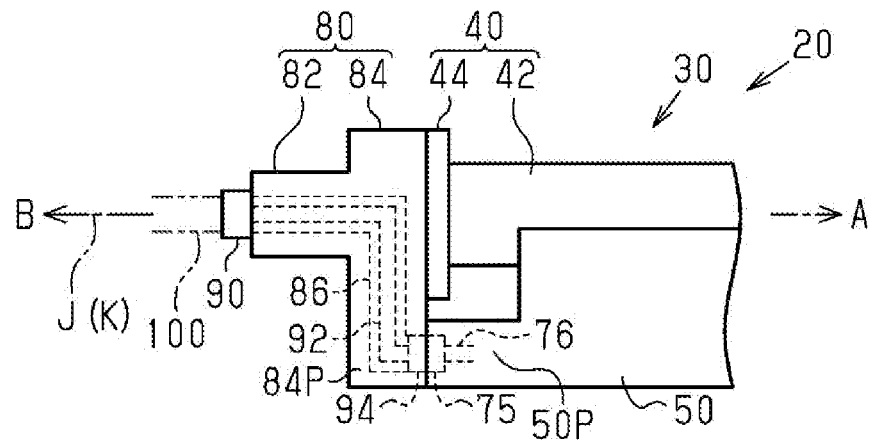
FIG. 9 is a schematic side view illustrating a modification example of electrical connection in the actuator and the attachment.

The arrangement of the actuator-side electric connector 75 and the second electric connector 94 is not limited to the example in the above embodiment. For example, the actuator-side electric connector 75 may be arranged on the manifold 50, and the actuator-side electric connector 75 and the second electric connector 94 are connected when the cylinder 40 and the attachment 80 are connected. Specifically, the shapes of the manifold 50 and the attachment 80 are designed such that the manifold 50 and the attachment 80 have portions that surface contact with each other when the cylinder 40 and the attachment 80 are coupled. In the example shown in FIG. 9, a protrusion SOP protruding toward the B side of the center axis J of the cylinder 40 is provided as a part of the manifold 50. Whereas the flange 84 of the attachment 80 is provided with a protrusion 84P that protrudes outward in the radial direction. An end surface of the protrusion SOP of the manifold 50 on the B side of the center axis J of the cylinder 40 surface contacts an end surface of the protrusion 84P of the flange 84 of the attachment 80 on the A side of the center axis K. In such a configuration, the actuator-side electric connector 75 is disposed in a portion of the protrusion SOP of the manifold 50 where contacts the protrusion 84P of the flange 84 of the attachment 80. The second electric connector 94 is disposed in a portion of the protrusion 84P of the flange 84 of the attachment 80 where contacts the protrusion SOP of the manifold 50. With such a configuration, the actuator-side electric connector 75 and the second electric connector 94 can be connected to each other when the cylinder 40 is coupled to the attachment 80. As shown in FIG. 9, as a result of changing the arrangement of the actuator-side electric connector 75 and the second electric connector 94, the actuator-side electric connector 75 and the second electric connector 94 may be not aligned with the first electric connector 90 in the center axis J direction of the cylinder main body 42. Even in this case, if the relay wire 92 is appropriately extended, there is no problem in connecting the first electric connector 90 and the second electric connector 94. Depending on the arrangement of the relay wire 92, the structure of the attachment 80, such as the extending direction of the housing hole 86, may be appropriately changed.

The arrangement of the first electric connector 90 is not limited to the above example in the embodiment. The first electric connector 90 may be disposed at any position appropriate for connecting the electric wire 100. For example, the first electric connector 90 may be disposed on the outer peripheral surface of the attachment main body 82.

The shapes of the first electric connector 90, the second electric connector 94, and the actuator-side electric connector 75 are not limited to the above examples in the embodiment.

Alternatively, the second electric connector 94 and the relay wire 92 may be removed, and the actuator-side electric connector 75 and the first electric connector 90 may be directly connected to each other when the cylinder 40 and the attachment 80 are coupled. For example, the attachment main body 82 is shortened in the direction of its center axis K and the housing hole 86 is removed. In this case, when the position sensor 70 is fitted into the fitting recess 85 as the cylinder 40 and the attachment 80 are coupled to each other, the end surface of the position sensor 70 on the protruding tip side reaches to the end surface of the attachment main body 82. Accordingly, it is possible to connect the actuator-side electric connector 75 disposed on the tip end surface of the position sensor 70 with the first electric connector 90 disposed on the end surface of the attachment main body 82.

The entire electrical system in the attachment 80 may be eliminated. Specifically, the second electric connector 94, the relay wire 92, and the first electric connector 90 may be removed. In this case, the electric wire 100 may be directly connected to the actuator 30.

The position and extending direction of the through hole 89 in the attachment 80 are not limited to the above example in the embodiment. For example, the through hole 89 may penetrate the flange 84 in the direction of the center axis K of the attachment main body 82. In this case, the first hydraulic connector 96 may be disposed on the end surface of the flange 84 on the B side of the center axis K of the attachment main body 82 at the position where the opening of the through hole 89 is formed.

Regarding the flow path of the hydraulic oil, the manifold 50 and the attachment 80 may be configured such that the connection passage 54 of the manifold 50 is directly connected with the through hole 89 in the attachment 80 without using the connection passage 45 in the cylinder 40. Specifically, the shapes of the manifold 50 and the attachment 80 are designed such that the manifold 50 and the attachment 80 each have a portion where surface contacts with each other when the cylinder 40 and the attachment 80 are coupled. The connection passage 54 in the manifold 50 and the through hole 89 in the attachment 80 are opened at the portions where the manifold 50 and the attachment 80 surface contact with each other. With such a configuration, the connection passage 54 in the manifold 50 and the through hole 89 in the attachment 80 can be connected to each other when the cylinder 40 and the attachment 80 are coupled to each other.

The shapes of the first hydraulic connector 96, the second hydraulic connector 98, and the actuator-side hydraulic connector 46 are not limited to the above example in the embodiment. These connectors may have shapes that correspond to the shapes of the through hole 89 in the attachment 80 and the connection passage 45 in the cylinder 40.

In the attachment 80, all the features related to the flow of hydraulic oil such as the first hydraulic connector 96 and the through hole 89 may be eliminated. In this case, the hydraulic pipe 102 may be directly connected to the manifold 50.

The configuration of the connection-disconnection section is not limited to the one with a flange. For example, in the example shown in FIG. 10, the flange 44 of the cylinder 40 is omitted, and a cylindrical tube portion 142 protruding toward the B side of the center axis J is provided on the end surface of the cylinder main body 42 on the B side of the center axis J. The tube portion 142 is disposed coaxially with the cylinder main body 42. Further, the flange 84 of the attachment 80 is omitted, and a cylindrical insertion portion 182 protruding toward the A side of the center axis K is provided on the end surface of the attachment main body 82 on the A side of the center axis K. The insertion portion 182 is coaxial with the attachment main body 82. The outer diameter of the insertion portion 182 is substantially the same as the inner diameter of the tube portion 142. Then, by inserting the insertion portion 182 into the tube portion 142, the insertion portion 182 fits into the tube portion 142. In this state, a bolt is penetrated through the tube portion 142 and the insertion portion 182 in the radial direction of the tube portion 142 to fix the tube portion 142 and the insertion portion 182. In this way, the connection-disconnection section may be configured to include the tube portion 142 and the insertion portion 182. Even with this connection-disconnection section, the cylinder 40 and the attachment 80 can be connected to and separated from each other by inserting and removing the insertion portion 182 into/from the tube portion 142. In this way the cylinder 40 and the attachment 80 can be easily connected to and separated from each other.

Regarding the connection-disconnection section including the tube portion 142 and the insertion portion 182, any method can be used to fix the tube portion 142 and the insertion portion 182 in addition to the bolt. For example, a wedge may be disposed between the inner peripheral surface of the tube portion 142 and the outer peripheral surface of the insertion portion 182 to fix them.

Figure 10:
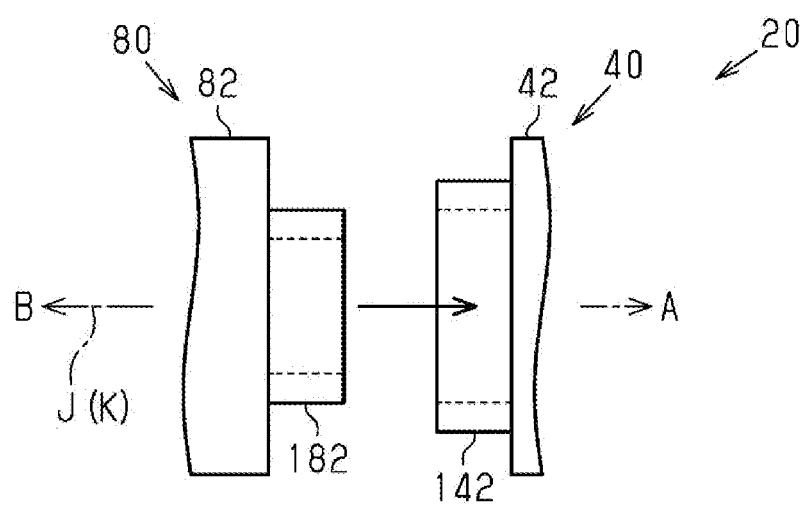
FIG. 10 is a schematic side view illustrating a modification example of a connection-disconnection section.

Regarding the connection-disconnection section including the tube portion 142 and the insertion portion 182, the shapes of the tube portion 142 and the insertion portion 182 are not limited to the example shown in FIG. 10. The tube portion 142 and the insertion portion 182 may have shapes that are complementary to each other so that one fits into the other. For example, the tube portion 142 and the insertion portion 182 may be formed in a square tubular shape. Further, the insertion portion 182 does not necessarily have a tubular shape, and may have any shape that fits inside the tube portion 142. For example, when the tube portion 142 is formed in a square tubular shape, the insertion portion 182 may be configured in a rectangular parallelepiped shape.

Regarding the connection-disconnection section including the tube portion 142 and the insertion portion 182, the tube portion 142 may be provided in the attachment 80 and the insertion portion 182 that fits on the inner peripheral surface of the tube portion 142 may be provided in the cylinder 40.

The actuator 30 is not limited to the electrohydraulic actuator. The technique of the above embodiment can be applied to any actuator that operates by utilizing the pressure of a fluid. For example, a pneumatic actuator may be adopted as the actuator 30.

As the actuator 30, an electromechanical actuator (EMA) may be used. In the case of the electromechanical actuator, a motor housing body that accommodates a motor is attached to the cylinder 40 instead of the manifold 50. Rotary motion of the motor is converted into a linear motion and transmitted to the output rod 60. In the case where an electromechanical actuator is adopted as the actuator 30, all the features relating to the hydraulic oil flow may be eliminated from the cylinder 40 and the attachment 80.

The coupling structure in which the drive unit 20 is coupled to the main wing 10 is not limited to the above example in the embodiment. For example, the reaction link 120 may be provided with a coupling structure to be coupled to the spar of the main wing 10.

The output rod 60 may be attached to the flap 12 via another link member.

A flight control surface to which the drive unit 20 is applied is not limited to the flap. For example, the drive unit 20 may be used for an aileron or an elevator.

A subject to which the drive unit 20 is applied is not limited to the control surfaces. The subject to which the drive unit 20 is applied may be any movable part of an aircraft. For example, the drive unit 20 may be applied to a landing gear.

Other Embodiments

The following numbered examples are embodiments.
1. A drive unit, comprising:
an actuator from which an output rod protrudes at one end of the cylinder, the output rod being coupled to a movable part of an aircraft;
an attachment disposed on the other end side of the cylinder;
a reaction link coupled to the movable part at one end of the reaction link and coupled to the attachment at the other end of the reaction link; and
a connection-disconnection section allowing the cylinder and the attachment to be coupled to and separated from each other,
wherein the connection-disconnection section includes:
a flange provided at said the other end of the cylinder, the flange protruding outward in a radial direction of the cylinder;
a flange provided at an end of the attachment facing the cylinder, the flange protruding outward in the radial direction of the cylinder; and
a bolt allowing the flange of the cylinder and the flange of the attachment to be coupled to and separated from each other,
wherein the attachment includes a first hydraulic connector disposed at one end of a flow path defined inside the attachment and a second hydraulic connector disposed at the other end of the flow path, the first hydraulic connector is connected with a hydraulic pipe outside the attachment,
wherein the actuator includes a manifold and an actuator-side hydraulic connector, the manifold is provided integrally with the cylinder and a hydraulic circuit is defined therein, the actuator-side hydraulic connector is connected to the second hydraulic connector of the attachment when the attachment is coupled to the cylinder, and the actuator further includes therein a passage that connects the actuator-side hydraulic connector and the hydraulic circuit,
wherein the second hydraulic connector includes a flow path defined therein, an attachment switching valve is provided in the flow path in the second hydraulic connector, the attachment switching valve opens the flow path in the second hydraulic connector when the attachment is coupled to the cylinder and closes the flow path in the second hydraulic connector when the attachment is separated from the cylinder, and
wherein the actuator-side hydraulic connector includes a flow path defined therein, an actuator switching valve is provided in the flow path in the actuator-side hydraulic connector, and the actuator switching valve opens the flow path in the actuator-side hydraulic connector when the attachment is coupled to the cylinder and closes the flow path in the actuator-side hydraulic connector when the attachment is separated from the cylinder.

2. A maintenance method for a drive unit, comprising:
a separation step in which an attachment is separated from an actuator, an output rod protruding from the actuator at one end of a cylinder, the output rod being coupled to a movable part of an aircraft, and the attachment being disposed on the other end side of the cylinder; and
an actuator removal step in which the output rod is disconnected from the movable part while a reaction link remains coupled to the movable part, one end of the reaction link being coupled to the movable part and the other end of the reaction link being coupled to the attachment.

3. A maintenance method for a drive unit, comprising:
a separation step in which an attachment is separated from an actuator, an output rod protruding from the actuator at one end of a cylinder, the output rod being coupled to a movable part of an aircraft, and the attachment being disposed on the other end side of the cylinder; and
a reaction link removal step in which one end of a reaction link is disconnected from the movable part while the output rod remains coupled to the movable part, the reaction link being coupled to the movable part at said one end of the reaction link and coupled to the attachment at the other end of the reaction link.

What is claimed is:
1. A drive unit, comprising:
an actuator from which an output rod protrudes at a first end of a cylinder, the output rod being coupled to a movable part of an aircraft;
an attachment disposed on a second end of the cylinder, the second end being the end opposite the first end along an axial direction of the cylinder;
a reaction link coupled to the movable part at a first end of the reaction link and coupled to the attachment at a second end of the reaction link; and
a connection-disconnection section allowing the cylinder and the attachment to be coupled to and separated from each other,
wherein the attachment includes a first electric connector to which an external electric wire extended from the outside of the attachment is connected, and
wherein the actuator includes an actuator-side electric connector, the actuator-side electric connector being connected to the first electric connector by coupling the attachment to the cylinder.

2. The drive unit of claim 1, wherein the connection-disconnection section includes:
a flange provided at the second end of the cylinder, the flange protruding outward in a radial direction of the cylinder;
a flange provided at an end of the attachment facing the cylinder, the flange protruding outward in the radial direction of the cylinder; and
a bolt allowing the flange of the cylinder and the flange of the attachment to be coupled to and separated from each other.

3. The drive unit of claim 1, wherein the connection-disconnection section includes:

a tube portion disposed at one of: the second end of the cylinder and the end of the attachment facing the cylinder; and an insertion portion disposed at the other of: the second end of the cylinder and the end of the attachment facing the cylinder, the insertion portion being fitted in the tube portion.

4. The drive unit of claim 1, wherein the first electric connector and the actuator-side electric connector are aligned in the axial direction of the cylinder.

5. The drive unit of claim 1, wherein a convex portion is provided at one of: the second end of the cylinder, and the end of the attachment facing the cylinder, the convex portion protrudes toward the other of: the second end of the cylinder, and the end of the attachment facing the cylinder, and wherein a concave portion is provided at the other of: the second end of the cylinder, and the end of the attachment facing the cylinder, the convex portion is fitted in the concave portion, and wherein a second electric connector connected to the first electric connector is disposed on one of: an end surface of the convex portion on a protruding side, and a bottom of the concave portion, and wherein the actuator-side electric connector is disposed on the other of: the end surface of the convex portion on the protruding side, and the bottom of the concave portion.

6. The drive unit of claim 5, wherein the convex portion is a position sensor provided at the second end of the cylinder.

7. The drive unit of claim 1, wherein the actuator includes a manifold that is provided integrally with the cylinder and in which a hydraulic circuit is defined, wherein the attachment includes a first hydraulic connector disposed at a first end of a flow path defined inside the attachment and a second hydraulic connector disposed at a second end of the flow path, the first hydraulic connector is connected with a hydraulic pipe outside the attachment, and wherein the actuator includes an actuator-side hydraulic connector that is connected to the second hydraulic connector of the attachment when the attachment is coupled to the cylinder, and the actuator includes therein a passage that connects the actuator-side hydraulic connector and the hydraulic circuit.

8. The drive unit of claim 7, wherein the second hydraulic connector includes a flow path defined therein, an attachment switching valve is provided in the flow path in the second hydraulic connector, the attachment switching valve opens the flow path in the second hydraulic connector when the attachment is coupled to the cylinder and closes the flow path in the second hydraulic connector when the attachment is separated from the cylinder, and wherein the actuator-side hydraulic connector includes a flow path defined therein, an actuator switching valve is provided in the flow path in the actuator-side hydraulic connector, the actuator switching valve opens the flow path in the actuator-side hydraulic connector when the attachment is coupled to the cylinder and closes the flow path in the actuator-side hydraulic connector when the attachment is separated from the cylinder.

9. The drive unit of claim 7, wherein an outer surface of the attachment has a pair of cylindrical protrusions, wherein the pair of cylindrical protrusions are disposed on opposite sides of an axis of the cylinder, wherein the reaction link has a pair of leg portions, a first leg portion from the pair of leg portions swings about a first cylindrical protrusion from the pair of cylindrical protrusions, and a second leg portion from the pair of leg portions swings about a second cylindrical protrusion from the pair of cylindrical protrusions, wherein the first hydraulic connector is disposed on an end surface of the protrusion on a tip side, and wherein a part of the flow path is defined inside the cylindrical protrusion.

* * * * *